(12) United States Patent
Takahashi et al.

(10) Patent No.: US 9,193,289 B2
(45) Date of Patent: Nov. 24, 2015

(54) VEHICLE SEAT

(71) Applicants: Central Japan Railway Company, Nagoya-shi (JP); Tenryu Industries Co., Ltd., Toyama-shi (JP)

(72) Inventors: Yukio Takahashi, Nagoya (JP); Hiroki Tsunoda, Nagoya (JP); Soshi Kawakami, Nagoya (JP); Yuya Futamura, Nagoya (JP); Masaki Yamabe, Toyama (JP)

(73) Assignee: CENTRAL JAPAN RAILWAY COMPANY, Toyama-shi, Toyama (JP)

( * ) Notice: Subject to any disclaimer, the term of this patent is extended or adjusted under 35 U.S.C. 154(b) by 24 days.

(21) Appl. No.: 14/059,865

(22) Filed: Oct. 22, 2013

(65) Prior Publication Data

US 2014/0117737 A1    May 1, 2014

(30) Foreign Application Priority Data

Oct. 31, 2012    (JP) .................................. 2012-240843

(51) Int. Cl.
*A47C 7/02* (2006.01)
*B60N 2/72* (2006.01)
*B60N 2/58* (2006.01)
*B60N 2/70* (2006.01)
*B61D 33/00* (2006.01)

(52) U.S. Cl.
CPC ................ *B60N 2/72* (2013.01); *B60N 2/5825* (2013.01); *B60N 2/7094* (2013.01); *B61D 33/0035* (2013.01)

(58) Field of Classification Search
CPC .......... B60B 2/5825; B60B 2/68; B60B 2/58; B60B 2/70
USPC .............. 297/452.56, 452.57, 452.59, 452.18
See application file for complete search history.

(56) References Cited

U.S. PATENT DOCUMENTS

| | | | | |
|---|---|---|---|---|
| 3,289,220 A | * | 12/1966 | Grimshaw ........................ 5/220 |
| 4,527,832 A | * | 7/1985 | McMains et al. ............. 297/359 |
| 4,761,035 A | * | 8/1988 | Urai .......................... 297/452.56 |
| 4,832,400 A | * | 5/1989 | Aoki et al. ................ 297/284.4 |
| 4,869,554 A | * | 9/1989 | Abu-Isa et al. .......... 297/452.56 |

(Continued)

FOREIGN PATENT DOCUMENTS

| | | |
|---|---|---|
| EP | 0 342 790 A1 | 11/1989 |
| EP | 1 547 488 A1 | 6/2005 |

(Continued)

OTHER PUBLICATIONS

Extended European Search Report dated Jan. 17, 2014.

*Primary Examiner* — Laurie Cranmer
(74) *Attorney, Agent, or Firm* — McGinn IP Law Group PLLC (57) ABSTRACT

The present invention provides a vehicle seat which includes a seat back including a seat back body and an upholstery that covers front, back, and upper surfaces and both side surfaces of the seat back body. In the vehicle seat, the seat back body includes a frame having a frame shape and serving as a framework, a front-side cover portion placed so as to cover a front side of an inner space of the frame and supporting a back of a seated occupant, and a back-side cover portion placed so as to cover a rear side of the inner space. The front-side cover portion and the back-side cover portion are covered by the upholstery. The back-side cover portion includes a flexible back-side sheet body stretched across the frame.

14 Claims, 9 Drawing Sheets

(56) References Cited

U.S. PATENT DOCUMENTS

| | | | |
|---|---|---|---|
| 6,786,544 B1* | 9/2004 | Muraishi | 297/216.14 |
| 7,396,079 B2* | 7/2008 | Heidmann et al. | 297/285 |
| 8,590,978 B2* | 11/2013 | Jaranson et al. | 297/452.15 |
| 8,857,908 B2* | 10/2014 | Brncick et al. | 297/284.1 |
| 2001/0040404 A1* | 11/2001 | Kawashima | 297/452.56 |
| 2002/0060493 A1* | 5/2002 | Nishino et al. | 297/452.56 |
| 2006/0138841 A1* | 6/2006 | Satou et al. | 297/353 |
| 2009/0102270 A1* | 4/2009 | Wissner et al. | 297/452.56 |

FOREIGN PATENT DOCUMENTS

| | | |
|---|---|---|
| FR | 2 837 151 A1 | 9/2003 |
| FR | 2 853 598 A1 | 10/2004 |
| JP | 2006-061406 A | 3/2006 |
| JP | 2011-251670 A | 12/2011 |
| WO | WO 2005/037020 A | 4/2005 |

* cited by examiner

VEHICLE SEAT

TECHNICAL FIELD

The present invention relates to vehicle seats having a seat back, and more particularly to vehicle seats capable of implementing reduction in weight.

BACKGROUND ART

Conventionally, seats for, e.g., cars have a synthetic resin board member placed on the back side of a seat back so as to form the back surface of the seat back (see, e.g., Patent Literature 1). When a backseat occupant or passenger presses the seat back of a seat in front of him/her, this board member serves not to allow the influence of such pressing to be transmitted to the back of a passenger or occupant seated on this seat.

CITATION LIST

Patent Literature

Patent Literature 1: Japanese Patent Application Publication No. 2011-251670

SUMMARY OF THE INVENTION

Technical Problem

In the conventional seats, the back surface of the seat back is formed by the board member. Even though the board member is made of a synthetic resin, it needs to be thick enough to achieve appropriate strength. In recent years, reduction in weight of the seats has been so greatly desired that the weight of the board member has become an issue.

The present invention was developed to overcome the conventional disadvantage, and it is an object of the present invention to provide a vehicle seat capable of suppressing any influence from a backseat occupant or passenger and capable of implementing reduction in weight.

Solution to Problem

A vehicle seat according to the present invention has the following configuration in order to achieve the above object.

A vehicle seat according to a first aspect of the present invention is a vehicle seat including: a seat back including a seat back body and an upholstery that covers front, back, and upper surfaces and both side surfaces of the seat back body. The seat back body includes a frame having a frame shape and serving as a framework, a front-side cover portion placed so as to cover a front side of an inner space of the frame and supporting a back of a seated occupant, and a back-side cover portion placed so as to cover a rear side of the inner space, and the front-side cover portion and the back-side cover portion are covered by the upholstery. The back-side cover portion includes a flexible back-side sheet body stretched across the frame.

According to this seat, the front-side cover portion of the seat back body covers the front side of the inner space of the frame, and the back-side cover portion of the seat back body covers the back side of the inner space. Thus, the seat back body has the inner space between the front-side cover portion and the back-side cover portion. The front-side cover portion supports the back of the seated occupant, and supports the weight of the seated occupant leaning back in the seat. The back-side cover portion of the seat back body includes the flexible back-side sheet body. The back-side sheet body is stretched across the frame. This can avoid excessive deflection of the back-side sheet body when the seat back is pressed from behind. The back-side sheet body forms the back-side cover portion, and is covered by the upholstery. Thus, the back-side sheet body is not required to have such texture and decorativeness that are required for the upholstery, and can specialize only in the above function as the back-side sheet body. This increases choices of the material of the back-side sheet body, and facilitates manufacturing of the seat back. Moreover, providing the back-side cover portion with the back-side sheet body can reduce the weight of the back-side cover portion and thus the weight of the seat.

As in the vehicle seat according to a second aspect of the present invention, in the vehicle seat according to the first aspect of the present invention, the front-side cover portion may include a flexible front-side sheet body and a spring member extended between a peripheral edge of the front-side sheet body and the frame to pull and tense the front-side sheet body.

Advantageous Effects of Invention

According to the vehicle seat of the present invention, in addition to the upholstery, the back-side sheet body is provided on the back side of the seat back so as to be stretched across the frame. This can accurately suppress the influence from a backseat occupant or passenger, and can reduce the weight of the seat.

DESCRIPTION OF EMBODIMENTS

An embodiment of a vehicle seat according to the present invention will be described with reference to the accompanying drawings.

FIGS. 1 to 9 show an embodiment of the present invention. A seat according to the present invention is a seat for vehicles such as railway vehicles, buses, passenger cars, ships, and airplanes, and is applied to a seat having a seat back 1 (the illustrated embodiment is a seat that is preferably used in public transportation such as railway vehicles and buses).

Figure 1:
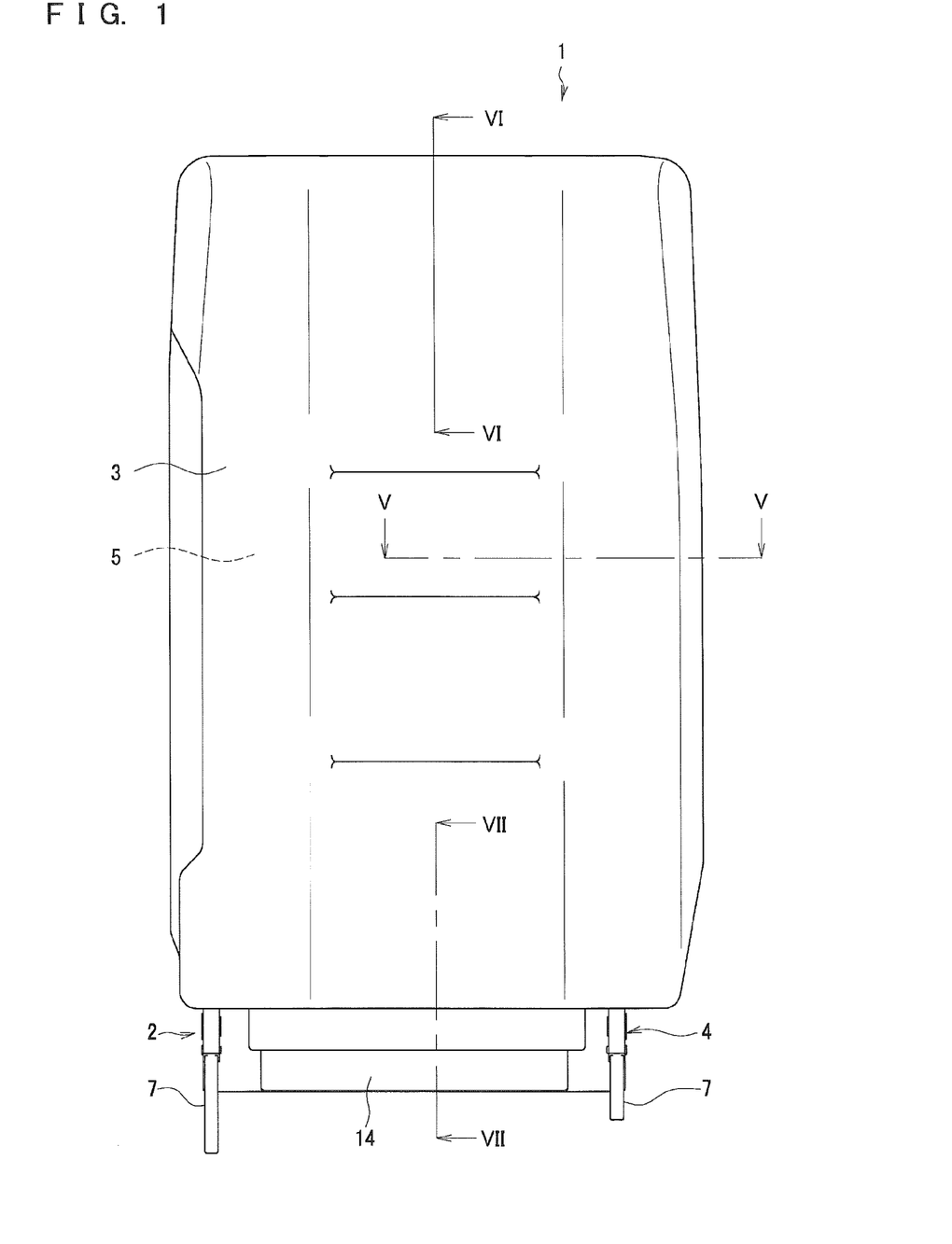
FIG. 1 is a front view of a seat back according to an embodiment of the present invention.
Figure 2:
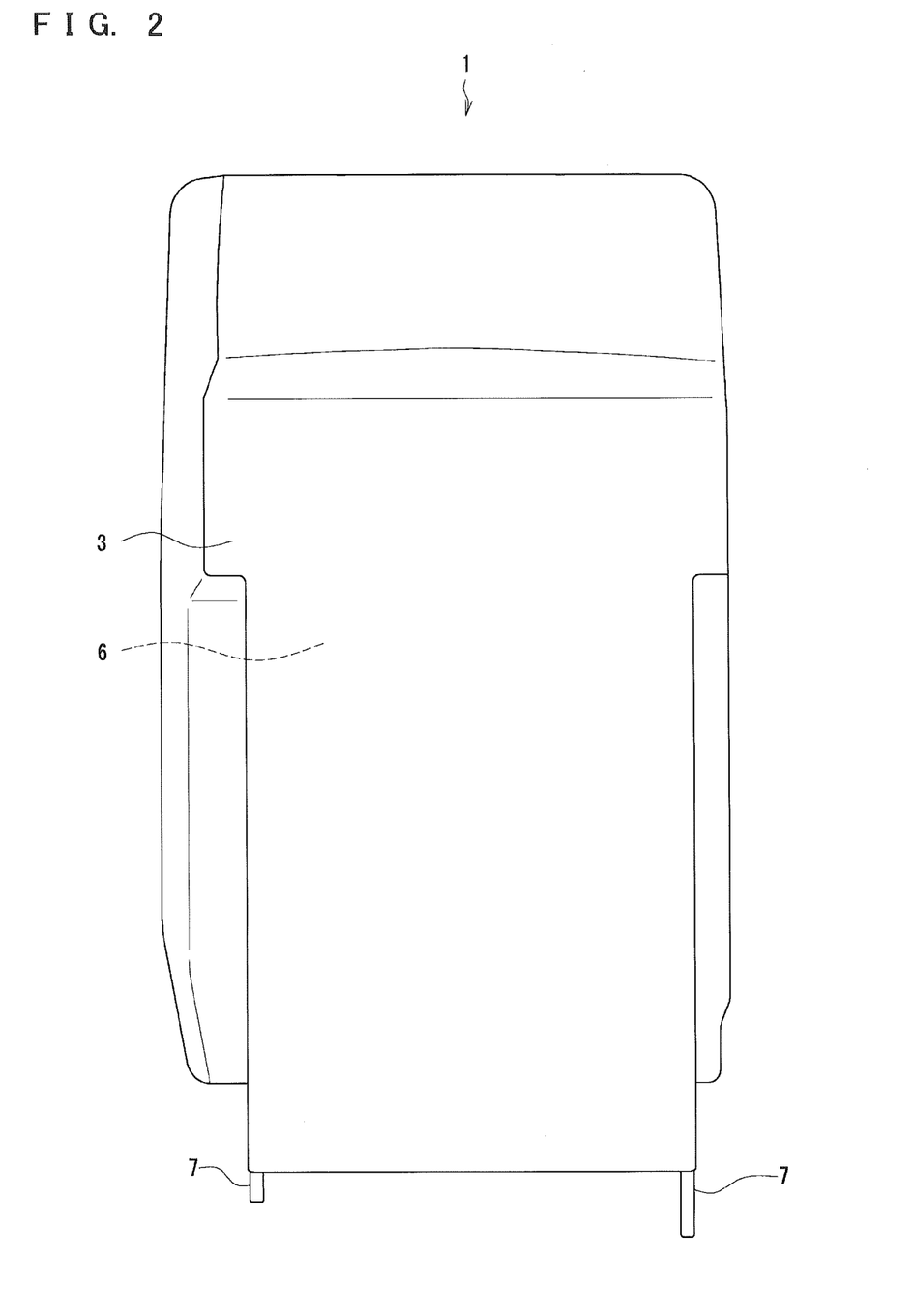
FIG. 2 is a back view of the seat back according to the embodiment of the present invention.
Figure 3:
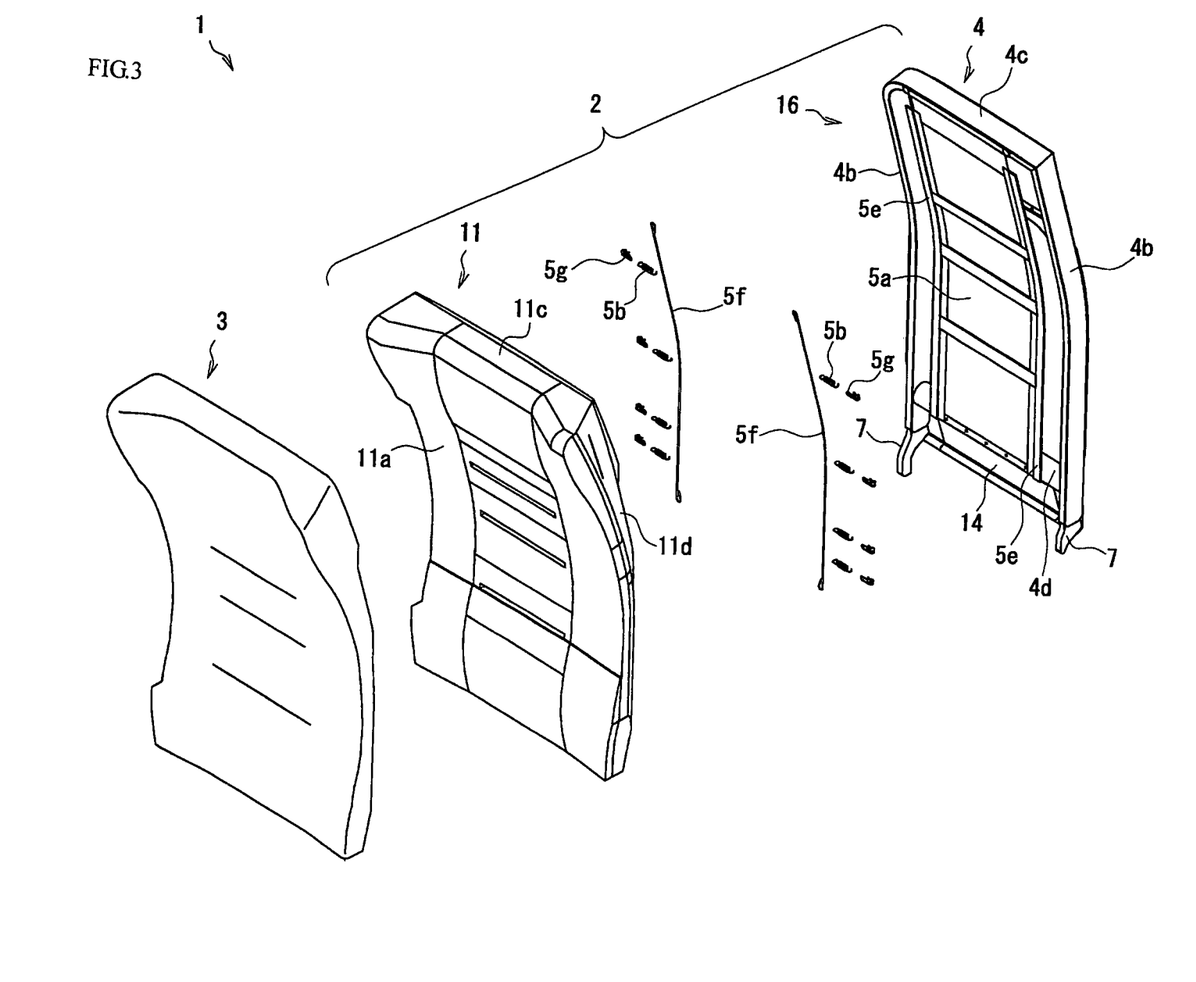
FIG. 3 is an exploded perspective view of the seat back according to the embodiment of the present invention.

The seat back 1 includes a seat back body 2 and an upholstery 3 that covers the front, back, and upper surfaces and both side surfaces of the seat back body 2 (see FIG. 3). The seat back body 2 includes a frame 4 having a frame shape and serving as a framework, a front-side cover portion 5 placed so as to cover the front side of an inner space 4a of the frame 4 to support the back of a seated occupant, and a back-side cover portion 6 placed so as to cover the rear side of the inner space 4a. The front-side cover portion 5 and the back-side cover portion 6 are covered by the upholstery 3.

The front-side cover portion 5 includes a flexible front-side sheet body 5a and spring members 5b (in the illustrated embodiment, coil springs) extended between the peripheral edge of the front-side sheet body 5a and the frame 4 to pull and tense the front-side sheet body 5a. The back-side cover portion 6 includes a flexible back-side sheet body 6a stretched across the frame 4.

Figure 4:
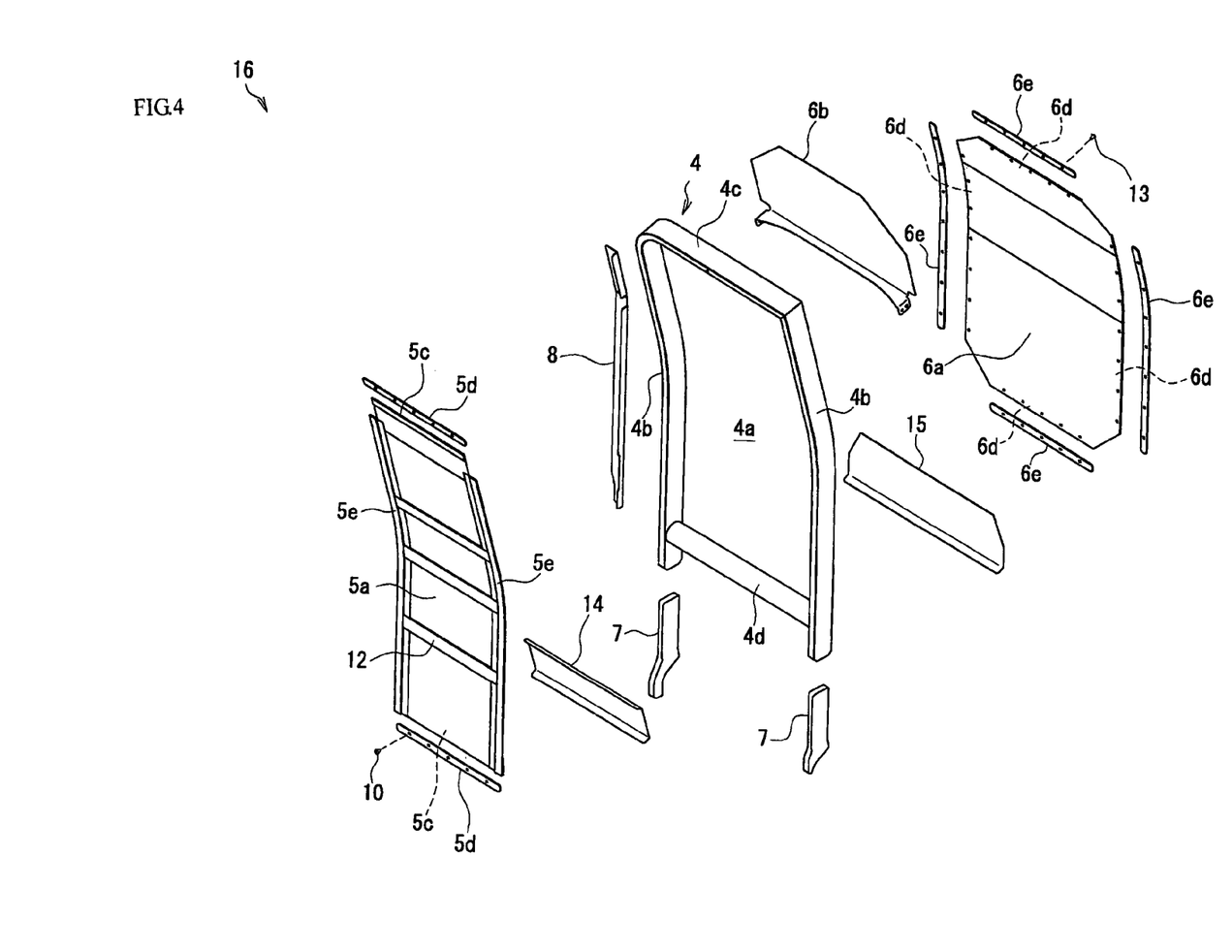
FIG. 4 is an exploded perspective view of a back frame assembly according to the embodiment of the present invention.
Figure 5:
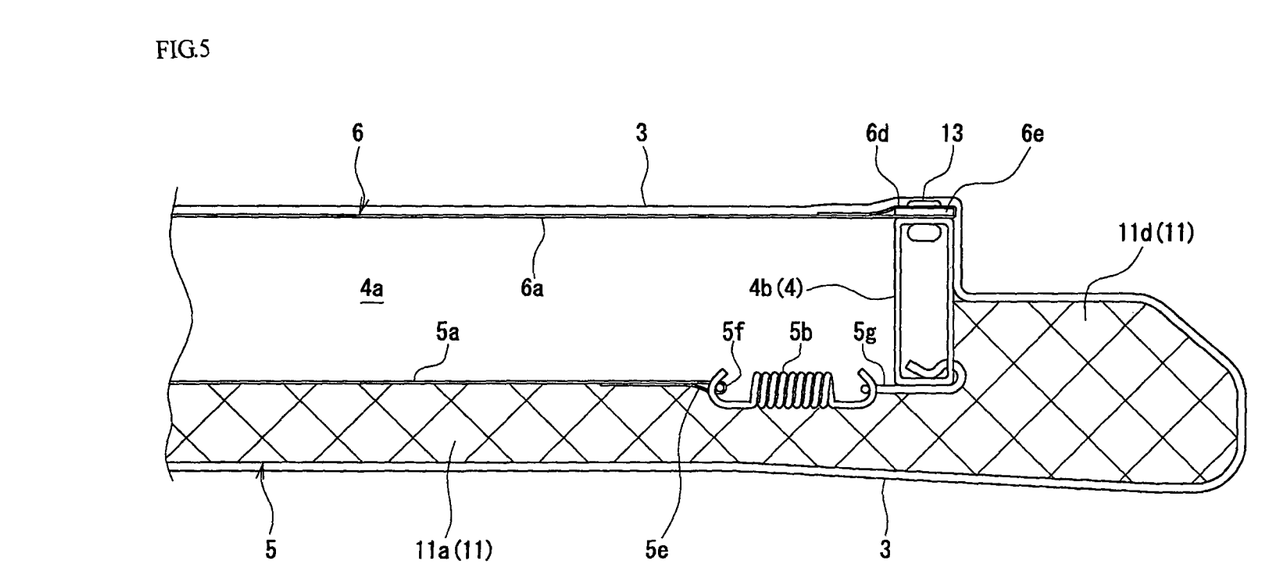
FIG. 5 is an enlarged sectional view of a main part taken along line V-V in FIG. 1 according to the embodiment of the present invention.
Figure 6:
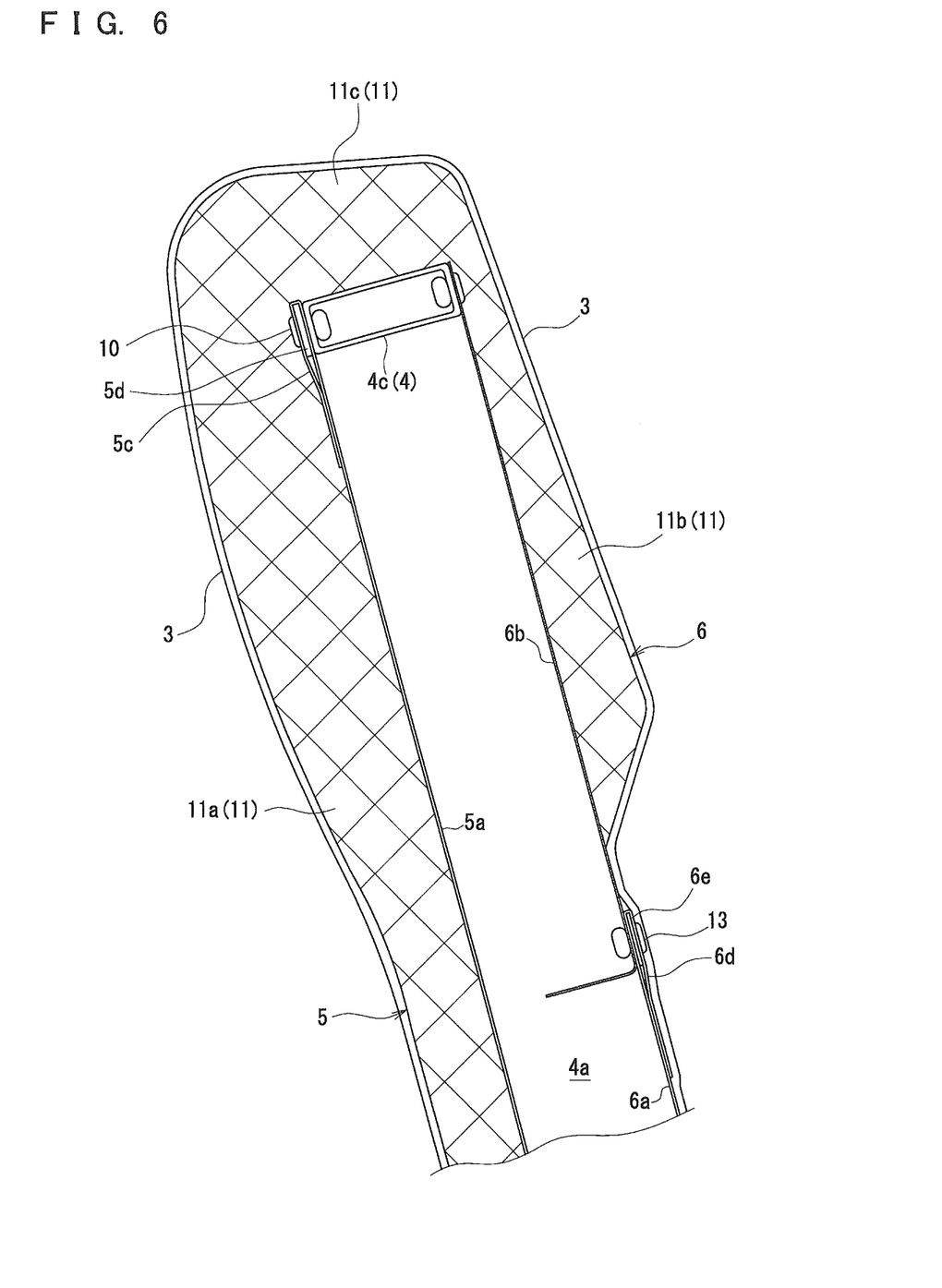
FIG. 6 is an enlarged sectional view of a main part taken along line VI-VI in FIG. 1 according to the embodiment of the present invention.

Specifically, as shown in FIG. 4, the frame 4 has side frame portions 4b, 4b placed along both sides of the seat back body 2 (seat back 1), and a top frame portion 4c placed along the upper side of the seat back body 2 (seat back 1) so as to connect the upper ends of the side frame portions 4b, 4b. In the illustrated embodiment, each of the side frame portions 4b and the top frame portion 4c is made of a pipe material having a rectangular section (specifically, a rectangular section having a longer side in the longitudinal direction). The frame 4 has a bottom frame portion 4d placed along the lower side of the seat back body 2 (seat back 1) so as to connect the lower parts of the side frame portions 4b, 4b. In the illustrated embodiment, the bottom frame portion 4d is made of a pipe material having a circular section. Attachment members 7 are respectively fixed to the lower ends of the side frame portions 4b of the frame 4 in order to attach the seat back 1 to a seating portion (not shown) of the seat. An auxiliary material 8 having, e.g., an L-shaped section is fixed to an intermediate part of one of the side frame portions 4b along the outer side surface of the side frame portion 4b.

The front-side sheet body 5a in the front-side cover portion 5 is made of, e.g., cloth using polyester (especially, high strength polyester), carbon fiber, nylon fiber, etc. The front-side sheet body 5a has a rectangular shape having a longer side in the vertical direction (see FIGS. 4 and 8). The front-side sheet body 5a is placed so as to cover the front side of the inner space 4a of the frame 4, and the upper and lower sides of the front-side sheet body 5a are fixed to the frame 4 (specifically, the top frame portion 4c and the bottom frame portion 4d). The right and left sides of the front-side sheet body 5a are pulled in the lateral direction by the spring members 5b, 5b.

Specifically, the front-side sheet body 5a has bag portions 5c, 5c formed by folding back the upper and lower sides of the front-side sheet body 5a. Core materials 5d, 5d having, e.g., a strip shape are inserted through the bag portions 5c, 5c, and the core materials 5d, 5d together with the bag portions 5c, 5c are fastened to the frame 4 (specifically, the top frame portion 4c and the bottom frame portion 4d) by using fasteners 10, 10 such as rivets. The front-side sheet body 5a further has bag portions 5e, 5e formed by folding back the right and left sides of the front-side sheet body 5a. Core materials 5f having, e.g., a bar shape are inserted through the bag portions 5e and one ends of the spring members 5b are hooked on the core materials 5f. The other ends of the spring members 5b are hooked on the frame 4 (specifically, the side frame portions 4b) via connectors 5g formed by bending, e.g., a bar material. The front-side sheet body 5a is thus supported in a laterally tensed state by the spring members 5b interposed between the front-side sheet body 5a and the frame 4.

The front-side cover portion 5 has front padding 11a having cushioning properties, in addition to the front-side sheet body 5a and the spring members 5b. The front padding 11a is disposed in front of the front-side sheet body 5a, the spring members 5b, and the frame 4 to cover the front-side sheet body 5a, the spring members 5b, and the frame 4. The front padding 11a is attached to the front-side sheet body 5a by using, e.g., hook-and-loop fastener 12.

Figure 9:
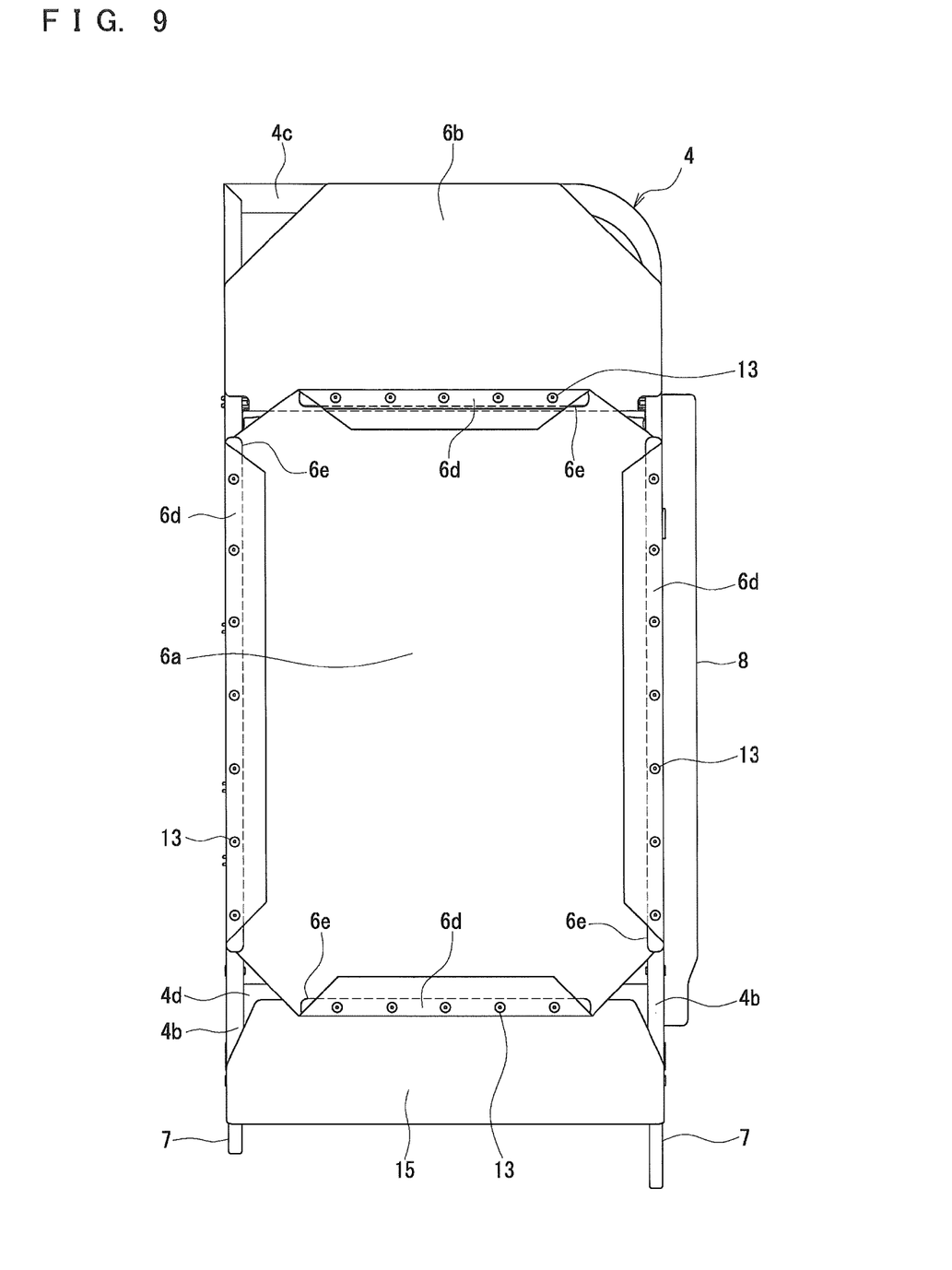
FIG. 9 is a back view of the seat back with its upholstery and padding removed therefrom according to the embodiment of the present invention.

The back-side cover portion 6 includes a back-side upper plate material 6b (specifically, back-side upper plate material made of a metal) in addition to the back-side sheet body 6a (see FIGS. 4 and 9). The back-side upper plate material 6b is extended across the frame 4 in the upper part of the seat back body 2 (seat back 1). The back-side upper plate material 6b has a rectangular shape with its upper right and left corners being cut off. The right and left sides of the back-side upper plate material 6b are fixed to the side frame portions 4b, 4b, and the upper side of the back-side upper plate material 6b is fixed to the top frame portion 4c.

The back-side sheet body 6a is placed continuously below the back-side upper plate material 6b so as to cover, together with the back-side upper plate material 6b, the rear side of the inner space 4a (see FIGS. 4 and 9). Like the front-side sheet body 5a, the back-side sheet body 6a is made of, e.g., cloth using polyester (especially, high strength polyester), carbon fiber, nylon fiber, etc. The back-side sheet body 6a has a rectangular shape with all of its corners being cut off. The right and left sides of the back-side sheet body 6a are fixed to the side frame portions 4b, 4b, the upper side of the back-side sheet body 6a is fixed to the lower end portion of the back-side upper plate material 6b, and the lower side of the back-side sheet body 6a is fixed to the bottom frame portion 4d (specifically, to the bottom frame portion 4d so as to overlap the upper end portion of a back-side lower plate material 15 described below). Specifically, the back-side sheet body 6a has bag portions 6d, 6d formed by folding back the right, left, upper, and lower sides of the back-side sheet body 6a. Core materials 6e, 6e having, e.g., a strip shape are inserted through the bag portions 6d, 6d, and the core materials 6e, 6e together with the bag portions 6d, 6d are fastened to the side frame portions 4b, 4b, the back-side upper plate material 6b, and the bottom frame portion 4d by using fasteners 13, 13 such as rivets. The back-side sheet body 6a is attached by pulling the back-side sheet body 6a in the lateral direction and fastening the right and left sides of the back-side sheet body 6a to the frame 4 (specifically, the side frame portions 4b, 4b), so that the back-side sheet body 6a is stretched across the frame 4 in a tensed state.

The back-side cover portion 6 has back padding 11b having cushioning properties, in addition to the back-side sheet body 6a and the back-side upper plate material 6b. The back padding 11b is disposed behind the back-side upper plate material 6b to cover the back-side upper plate material 6b. The back padding 11b is a part that together with the front padding 11a forms padding 11. The padding 11 has, in addition to the front padding 11a and the back padding 11b, upper padding 11c disposed above the frame 4 to cover the frame 4, and side padding lid disposed on the lateral sides of the frame 4 to cover the frame 4. The padding 11 is integrally formed by the front padding 11a, the back padding 11b, the upper padding 11c, and the side padding 11d by using, e.g., an elastic material such as urethane resin.

Figure 7:
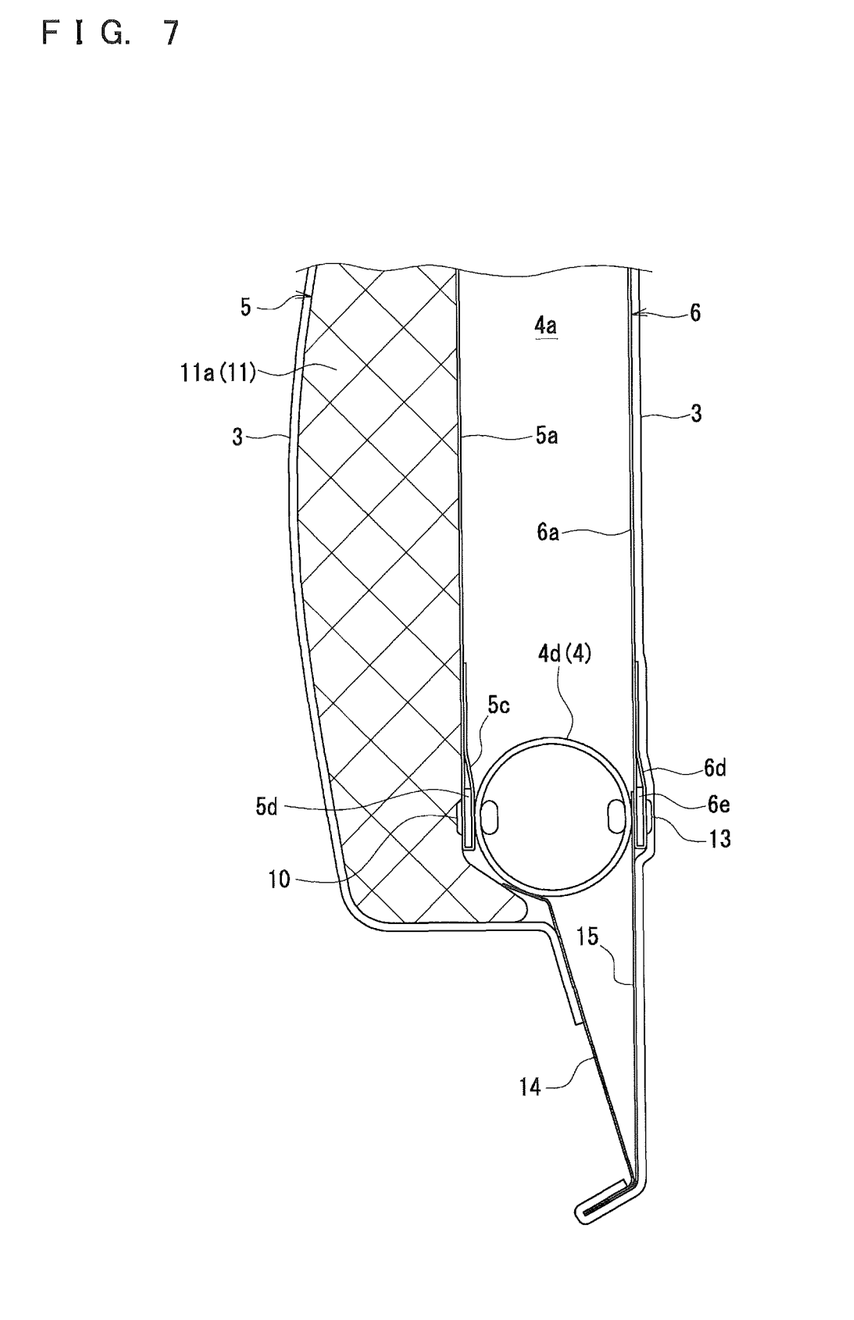
FIG. 7 is an enlarged sectional view of a main part taken along line VII-VII in FIG. 1 according to the embodiment of the present invention.
Figure 8:
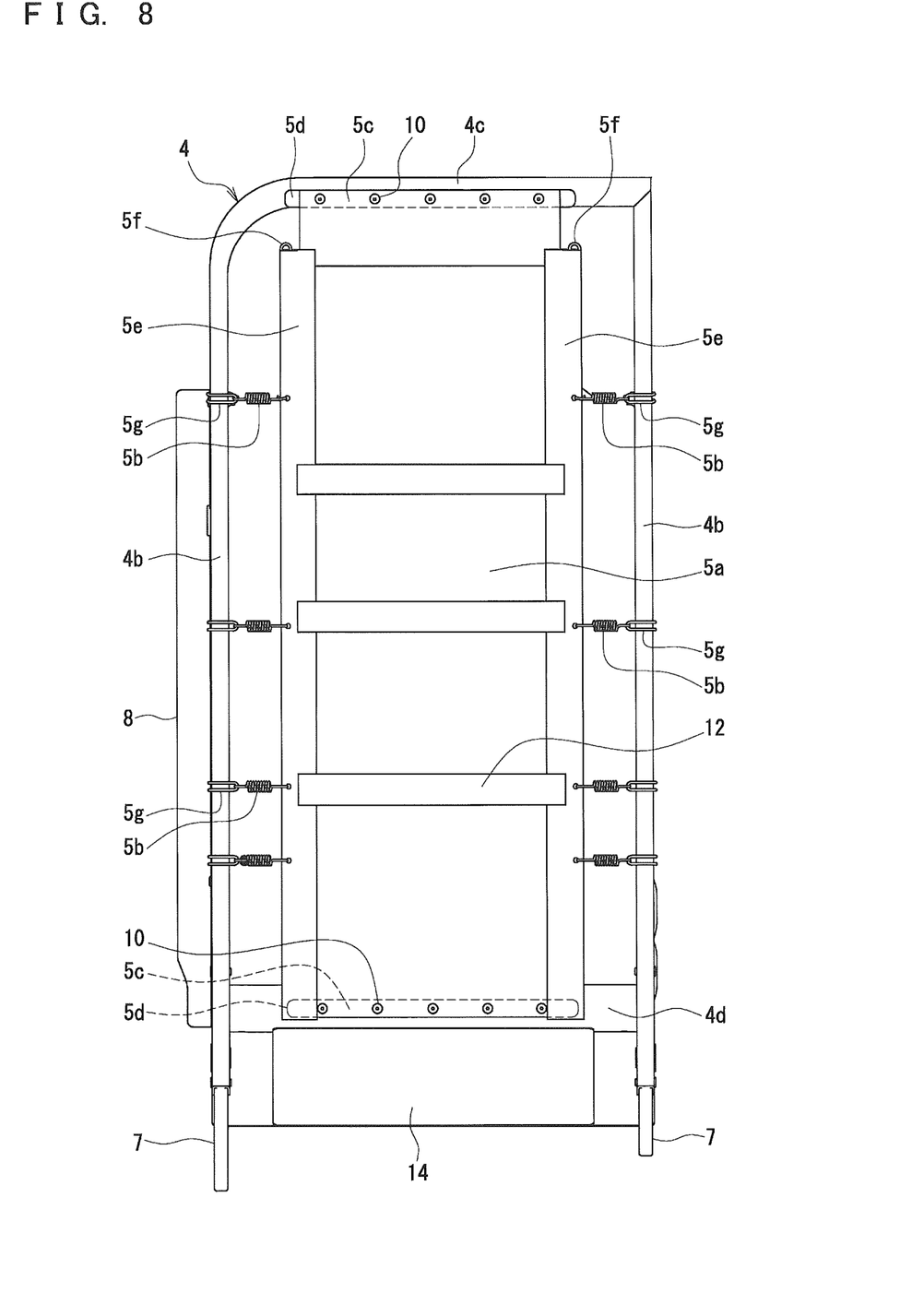
FIG. 8 is a front view of the seat back with its upholstery and padding removed therefrom according to the embodiment of the present invention.

In the illustrated embodiment, the seat back body 2 includes a front-side lower plate material 14 and the back-side lower plate material 15 in the lower part of the seat back body 2 (seat back 1) (see FIGS. 4 and 7). The front-side lower plate material 14 and the back-side lower plate material 15 are made of a metal. The back-side lower plate material 15 is fixed below the bottom frame portion 4*d* so as to be extended between the side frame portions 4*b*, 4*b* and across the bottom frame portion 4*d*. The front-side lower plate material 14 is fixed so as to be extended across the bottom frame portion 4*d* and the lower end portion of the back-side lower plate material 15.

The upholstery 3 covers the front, back, and upper surfaces and both side surfaces of the seat back body 2 as described above, and thus covers substantially the entire seat back body 2. That is, the upholstery 3 covers from the front padding 11*a* to the front-side lower plate material 14 on the front side of the seat back body 2, covers from the back padding 11*b* to the back-side sheet body 6*a* and the back-side lower plate material 15 on the back side of the seat back body 2, covers the upper padding 11*c* on the upper side of the seat back body 2, and covers the side padding 11*d* and the frame 4 on the right and left sides of the seat back body 2 (see FIGS. 5 to 7). The upholstery 3 is fixed to the seat back body 2 by using, e.g., a hook-and-loop fastener.

A back frame assembly 16 (see FIGS. 3 and 4) is formed by the frame 4, the front-side sheet body 5*a*, the back-side upper plate material 6*b*, the back-side sheet body 6*a*, etc. The core materials 5*f*, the spring members 5*b*, the connectors 5*g*, the padding 11, and the upholstery 3 described above are attached to the back frame assembly 16.

The measurement result of the amount of deflection of the back-side sheet body 6*a* of the back-side cover portion 6 of the seat back 1 when being pressed from behind will be described. The upholstery 3 is pressed in the central portion of the back-side sheet body 6*a*. In this case, a pressure plate having a diameter of 64 mm is placed on the upholstery 3, and is pressed by a push-pull gauge. The amount of deflection was 6 to 10 mm when a pressing force was 49 N (5 kgf), and 14 to 16 mm when a pressing force was 98 N (10 kgf).

Moreover, the amount of deflection of the front-side cover portion 5 (specifically, the amount of deflection of the front-side sheet body 5*a*) in response to the weight of a seated occupant was measured with the seated occupant shifting his/her weight on the front-side cover portion 5 having the front-side sheet body 5*a* in the state where the seat back 1 was reclined. As a result, the amount of deflection was 8 to 12 mm when the weight was 490 N (50 kgf), and 19 to 21 mm when the weight was 882 N (90 kgf). The seat back 1 used in this measurement had a space (inner space 4*a*) of 40 mm between the front-side sheet body 5*a* and the back-side sheet body 6*a*. Accordingly, even if an occupant weighting 882 N (90 kgf) is seated and the seat back 1 is pressed from behind with a pressing force of 98 N (10 kgf), a space of 3 to 7 mm is still secured between the front-side sheet body 5*a* and the back-side sheet body 6*a*. It is therefore preferable that the material and thickness of the front-side sheet body 5*a* and the back-side sheet body 6*a*, and the degree to which the front-side sheet body 5*a* and the back-side sheet body 6*a* are tightened be set so that the front-side sheet body 5*a* and the back-side sheet body 6*a* do not contact each other when an occupant weighting 882 N (90 kgf) is seated and a load is applied from the front and back sides of the seat back 1 under the above measurement conditions.

Advantages of the vehicle seat having the above configuration will be described. The seat back 1 of this seat is formed by the seat back body 2 and the upholstery 3 covering the seat back body 2. The seat back body 2 includes the frame 4 having a frame shape and serving as a framework, the front-side cover portion 5 covers the front side of the inner space 4*a* of the frame 4, and the back-side cover portion 6 covers the back side of the inner space 4*a*. Thus, the seat back body 2 has the inner space 4*a* between the front-side cover portion 5 and the back-side cover portion 6. The front-side cover portion 5 supports the back of the seated occupant, and supports the weight of the seated occupant leaning back in the seat.

The back-side cover portion 6 of the seat back body 2 includes the flexible back-side sheet body 6*a*. The back-side sheet body 6*a* is stretched across the frame 4. This can avoid excessive deflection of the back-side sheet body 6*a* when the seat back 1 is pressed from behind. In the illustrated embodiment, the back-side sheet body 6*a* is stretched across the frame 4 in a tensed state, which further limits such deflection. The back-side sheet body 6*a* forms the back-side cover portion 6, and is covered by the upholstery 3. Thus, the back-side sheet body 6*a* is not required to have such texture and decorativeness that are required for the upholstery 3, and can specialize only in the above function as the back-side sheet body 6*a*. This increases choices of the material of the back-side sheet body 6*a*, and facilitates manufacturing of the seat back 1. Moreover, providing the back-side cover portion 6 with the back-side sheet body 6*a* can reduce the weight of the back-side cover portion 6 and thus the weight of the seat. According to this seat, in addition to the upholstery 3, the back-side sheet body 6*a* is provided on the back side of the seat back 1 so as to be stretched across the frame 4. This can accurately suppress the influence from a backseat occupant, and can reduce the weight of the seat.

The front-side cover portion 5 includes the flexible front-side sheet body 5*a* and the spring members 5*b* pulling and tensing the front-side sheet body 5*a*. The front-side sheet body 5*a* and the spring members 5*b* thus support the weight of the seated occupant leaning back in the seat. In the illustrated embodiment, the front padding 11*a* covers the front side of the front-side sheet body 5*a* and the spring members 5*b*. Thus, the front-side sheet body 5*a* and the spring members 5*b* support via the front padding 11*a* the weight of the seated occupant leaning back in the seat. Since the front-side sheet body 5*a* and the spring members 5*b* support the weight of the seated occupant leaning back in the seat, the weight of the front-side cover portion 5 can be reduced. Combining the front-side cover portion 5 with the above-described back-side cover portion 6 including the back-side sheet body 6*a* can further reduce the weight of the seat.

The present invention is not limited to the above embodiment, and various modifications can be made to the embodiment. For example, in the above embodiment, the front-side cover portion 5 includes the front-side sheet body 5*a* and the spring members 5*b* pulling and tensing the front-side sheet body 5*a*, and the spring members 5*b* are disposed on the lateral sides of the front-side sheet body 5*a* to support the front-side sheet body 5*a* in a laterally tensed state. However, the spring members 5*b* may also be disposed above and/or below the front-side sheet body 5*a* to support the front-side sheet body 5*a* in a vertically tensed state. The front-side cover portion 5 may not be provided with the spring members 5*b*, and the front-side sheet body 5*a* may be stretched directly across the frame 4 in a tensed state.

The back-side sheet body 6*a* need only be stretched across the frame 4, and does not have to be stretched across the frame 4 in a tensed state.

The back-side sheet portion 6 includes the back-side upper plate material 6*b*. However, the back-side upper plate material 6*b* may be omitted, and the back-side sheet body 6*a* may be extended to the top frame portion 4*c*.

The front-side sheet body 5*a* and the back-side sheet body 6*a* are arranged so as to be located substantially at the same positions as the front and rear ends of the frame 4 in the longitudinal direction. However, one or both of the front-side sheet body 5a and the back-side sheet body 6a may be shifted toward the other or toward each other if the required inner space 4a is secured. Alternatively, a bracket, a spacer, etc. may be interposed between the frame 4 and one or both of the front-side sheet body 5a and the back-side sheet body 6a so that one or both of the front-side sheet body 5a and the back-side sheet body 6a are shifted away from the other or away from each other.

The front-side sheet body 5a and the back-side sheet body 6a do not have to be made of cloth, but may be made of a net, a resin sheet, etc., or may be made of a combination thereof.

REFERENCE SIGNS LIST

1 seat back
2 seat back body
3 upholstery
4 frame
4a inner space
5 front-side cover portion
5a front-side sheet body
5b spring member
6 back-side cover portion
6a back-side sheet body
6b back-side upper plate material

The invention claimed is:

1. A vehicle seat, comprising:
   a seat back including a seat back body and an upholstery that covers front, back, and upper surfaces and both side surfaces of the seat back body, wherein
   the seat back body includes a frame having a frame shape and serving as a framework, a front-side cover portion placed so as to cover a front side of an inner space of the frame and supporting a back of a seated occupant, and a back-side cover portion placed so as to cover a rear side of the inner space,
   the front-side cover portion and the back-side cover portion are covered by the upholstery,
   the back-side cover portion includes a flexible back-side sheet body stretched across the frame,
   the flexible back-side sheet body comprises cloth, a net, a resin sheet, or a combination thereof,
   wherein the front-side cover portion includes a flexible front-side sheet body and a spring member extended between a peripheral edge of the front-side sheet body and the frame to pull and tense the front-side sheet body, and
   wherein a degree to which the front-side sheet body and the back-side sheet body are tightened is set such that the front-side sheet body and the back-side sheet body do not contact each other.

2. The vehicle seat according to claim 1, wherein the back-side sheet body has a rectangular shape, and a left side, a right side, an upper side and a lower side of the back-side sheet body are fixed to the frame.

3. The vehicle seat according to claim 2, wherein the left side, the right side and the lower side of the back-side sheet body are fixed to the frame by using fasteners.

4. The vehicle seat according to claim 3, wherein the back-side cover portion further includes a back-side upper plate material that is extended across the frame and is fixed to the frame, and the upper side of the back-side sheet body is fixed to the back-side upper plate material by using the fasteners.

5. The vehicle seat according to claim 3, wherein the upper side of the back-side sheet body is extended to the frame and is fixed to the frame.

6. The vehicle seat according to claim 2, wherein the left side and the right side of the back-side sheet body are fixed to the frame by using fasteners in a state where the back-side sheet body is pulled in the lateral direction so that the back-side sheet body is stretched across the frame in a tensed state.

7. The vehicle seat according to claim 1, wherein the front-side sheet body has a rectangular shape, a right side and a left side of the front-side sheet body are pulled in a lateral direction by the spring member, and an upper side and a lower side of the front-side sheet body are fixed to the frame by using fasteners.

8. The vehicle seat according to claim 1, wherein the front-side sheet body has a rectangular shape, a right side and a left side of the front-side sheet body are pulled in a lateral direction by the spring member, and an upper side and a lower side of the front-side sheet body are pulled in a vertical direction by the spring member.

9. The vehicle seat according to claim 1, wherein the front-side sheet body is stretched directly across the frame in a tensed state.

10. The vehicle seat according to claim 1, wherein the flexible back-side sheet body is stretched across the frame of the seat such that load forces applied thereto causes a membrane stress.

11. The vehicle seat according to claim 1, wherein the frame includes:
    side frame portions disposed along both sides of the seat back body; and
    a top frame portion disposed along an upper side of the seat back body so as to connect upper ends of the side frame portions.

12. The vehicle seat according to claim 11, wherein each of the side frame portions and the top frame portion comprises a pipe including a rectangular section having a longer side in a longitudinal direction.

13. The vehicle seat according to claim 1, wherein the flexible back-side sheet body comprises a rectangular shape with all of its corners being cut off.

14. A vehicle seat, comprising:
    a seat back including a seat back body and an upholstery that covers front, back, and upper surfaces and both side surfaces of the seat back body, wherein
    the seat back body includes a frame having a frame shape and serving as a framework, a front-side cover portion placed so as to cover a front side of an inner space of the frame, and a back-side cover portion placed so as to cover a rear side of the inner space,
    the front-side cover portion and the back-side cover portion are covered by the upholstery,
    the back-side cover portion includes a flexible back-side sheet body stretched across the frame,
    the flexible back-side sheet body comprises at least one of cloth, a net, or a resin sheet,
    wherein the front-side cover portion includes a flexible front-side sheet body and a spring member extended between a peripheral edge of the front-side sheet body and the frame to pull and tense the front-side sheet body,
    wherein a degree to which the front-side sheet body and the back-side sheet body are tightened is set such that the front-side sheet body and the back-side sheet body do not contact each other.

* * * * *